United States Patent
Grant et al.

(10) Patent No.: US 10,379,614 B2
(45) Date of Patent: Aug. 13, 2019

(54) NON-COLLOCATED HAPTIC CUES IN IMMERSIVE ENVIRONMENTS

(71) Applicant: Immersion Corporation, San Jose, CA (US)

(72) Inventors: Danny Grant, Laval (CA); Christopher J. Ullrich, Ventura, CA (US)

(73) Assignee: Immersion Corporation, San Jose, CA (US)

( * ) Notice: Subject to any disclaimer, the term of this patent is extended or adjusted under 35 U.S.C. 154(b) by 39 days.

(21) Appl. No.: 14/280,726

(22) Filed: May 19, 2014

(65) Prior Publication Data

US 2015/0331488 A1  Nov. 19, 2015

(51) Int. Cl.
*G06F 3/01* (2006.01)
*G06F 3/0481* (2013.01)
*G06F 3/0484* (2013.01)

(52) U.S. Cl.
CPC .............. *G06F 3/016* (2013.01); *G06F 3/011* (2013.01); *G06F 3/014* (2013.01); *G06F 3/04815* (2013.01); *G06F 3/04842* (2013.01)

(58) Field of Classification Search
CPC .......... G06F 3/011; G06F 3/014; G06F 3/016; G06F 3/04815
See application file for complete search history.

(56) References Cited

U.S. PATENT DOCUMENTS

| | | |
|---|---|---|
| 5,442,729 A | 8/1995 | Kramer et al. |
| 5,482,056 A | 1/1996 | Kramer |
| 5,583,478 A * | 12/1996 | Renzi ................ G06F 3/014 340/407.1 |
| 5,676,157 A | 10/1997 | Kramer |
| 6,042,555 A | 3/2000 | Kramer et al. |
| 6,059,506 A | 5/2000 | Kramer |
| 6,088,017 A * | 7/2000 | Tremblay ............ G06F 3/011 345/156 |
| 6,104,379 A | 8/2000 | Petrich et al. |
| 6,110,130 A | 8/2000 | Kramer |
| 6,162,190 A | 12/2000 | Kramer |

(Continued)

FOREIGN PATENT DOCUMENTS

| | | |
|---|---|---|
| CN | 102473034 A | 5/2012 |
| CN | 102640083 A | 8/2012 |

(Continued)

OTHER PUBLICATIONS

First Examination Report issued by the European Patent Office in EP Application No. 15 166 824.1, dated May 18, 2017.

(Continued)

*Primary Examiner* — Ryan W Sherwin
(74) *Attorney, Agent, or Firm* — Medler Ferro Woodhouse & Mills PLLC

(57) ABSTRACT

A device for delivering non-collocated haptic feedback includes at least one haptic playback device and a drive circuit for controlling the haptic playback device. A processor coupled to the drive circuit receives manipulation haptic information based on data received from a user interface. The processor generates a haptic signal is based on the manipulation haptic information. The haptic signal is provided to the drive circuit to produce the non-collocated haptic feedback.

24 Claims, 5 Drawing Sheets

(56) References Cited

U.S. PATENT DOCUMENTS

| | | | |
|---|---|---|---|
| 6,413,229 B1 | 7/2002 | Kramer et al. | |
| 6,497,672 B2 | 12/2002 | Kramer | |
| 6,866,643 B2 | 3/2005 | Kramer | |
| 6,924,787 B2 | 8/2005 | Kramer et al. | |
| 7,696,860 B2* | 4/2010 | Gilson | G06F 1/163 |
| | | | 340/407.1 |
| 7,967,679 B2* | 6/2011 | Ombrellaro | A63F 13/02 |
| | | | 463/30 |
| 2005/0250582 A1* | 11/2005 | Lopez | A63F 13/02 |
| | | | 463/47 |
| 2007/0139167 A1 | 6/2007 | Gilson et al. | |
| 2010/0053151 A1 | 3/2010 | Marti et al. | |
| 2010/0295667 A1* | 11/2010 | Kyung | G06F 3/016 |
| | | | 340/407.2 |
| 2011/0021272 A1 | 1/2011 | Grant et al. | |
| 2011/0077055 A1 | 3/2011 | Pakula et al. | |
| 2011/0102332 A1 | 5/2011 | Birnbaum et al. | |
| 2013/0069862 A1* | 3/2013 | Ur | G06F 3/01 |
| | | | 345/156 |
| 2013/0115579 A1 | 5/2013 | Taghavi | |
| 2014/0062892 A1* | 3/2014 | Dickinson | G06F 3/0412 |
| | | | 345/173 |
| 2015/0277563 A1* | 10/2015 | Huang | G06F 3/016 |
| | | | 715/702 |
| 2015/0293590 A1* | 10/2015 | Lehtiniemi | G06F 3/016 |
| | | | 715/702 |

FOREIGN PATENT DOCUMENTS

| | | |
|---|---|---|
| JP | H7-20978 A | 1/1995 |
| JP | 2013-507059 A | 2/2013 |
| JP | 2013-509647 A | 3/2013 |
| WO | 2011/053474 A1 | 5/2011 |
| WO | 2010/027193 A3 | 6/2012 |

OTHER PUBLICATIONS

Decision to refuse a European Patent Application issued in European Application No. 15166824.1, dated Nov. 29, 2018.
Notice of Reasons for Rejection issued in Japanese Application No. 2015-094900, dated Jan. 8, 2019.
Notice of First Office Action issued in Chinese Application No. 201510251106.3, dated Feb. 26, 2019.
Notification of the First Office Action issued in Chinese Application No. 201510251106.3, dated Feb. 26, 2019.

* cited by examiner

NON-COLLOCATED HAPTIC CUES IN IMMERSIVE ENVIRONMENTS

FIELD

One embodiment is directed to a haptically-enabled device. More particularly, one embodiment is directed to a non-collocated haptically-enabled device.

BACKGROUND INFORMATION

Electronic device manufacturers strive to produce a rich interface for users. Conventional devices use visual and auditory cues to provide feedback to a user. In some user interfaces, kinesthetic feedback (such as active and resistive force feedback) and/or tactile feedback (such as vibration, texture, and heat) are also provided to the user, more generally known collectively as "haptic feedback" or "haptic effects." Haptic feedback can provide cues that enhance and simplify the user interface. For example, vibration effects, or vibrotactile haptic effects, may be useful in providing cues to users of electronic devices to alert the user to specific events, or provide realistic feedback to create greater sensory immersion within a simulated or virtual environment.

In order to generate vibration or other effects, many devices utilize some type of actuator or other haptic output device. Known actuators used for this purpose include an electromagnetic actuator such as an solenoid actuator, an Eccentric Rotating Mass ("ERM") actuator in which an eccentric mass is moved by a motor, a Linear Resonant Actuator vibration motor ("LRA"), an electro-active polymer actuator, and a piezoelectric actuator.

SUMMARY

In one embodiment, a device for delivering non-collocated haptic feedback includes at least one haptic playback device and a drive circuit for controlling the haptic playback device. A processor electronically coupled to the drive circuit receives manipulation haptic information based on data received from a user interface. The processor generates a haptic signal based on the manipulation haptic information. The processor provides the haptic signal to the drive circuit to produce the non-collocated haptic feedback.

DETAILED DESCRIPTION

Immersive displays, such as head mounted virtual reality displays, provide a whole new level of graphical immersion for gaming applications. As the visual and auditory senses are being deeply engaged it is possible to add a convincing haptic experience for the user by providing "haptic cues" that have a basic relationship with the user's virtual interactions. Thus, whereas typically haptic feedback provides a haptic sensation with the interacting member, such as a finger on a touchscreen, haptic cues can provide feedback to a nearby "non-collocated" member, such as a wrist, to achieve a convincing haptic experience.

One embodiment is a haptic playback device, such as an actuator, that can play haptic signals generated based a user's interaction with an application. Sensors can determine a user's interaction with the application and a haptic playback signal can be provided to provide haptic feedback by a haptic playback device. Rather than the haptic playback device being in contact with the user's interacting member, such as a finger or hand, the haptic playback device can be in contact with the user at a physical location different from the interacting member. Thus, the haptic playback device can be non-collocated with the interacting member. A haptic signal can be generated and provided to the haptic playback device to produce haptic feedback at the alternative physical location to provide a perceived virtual contact.

Figure 1:
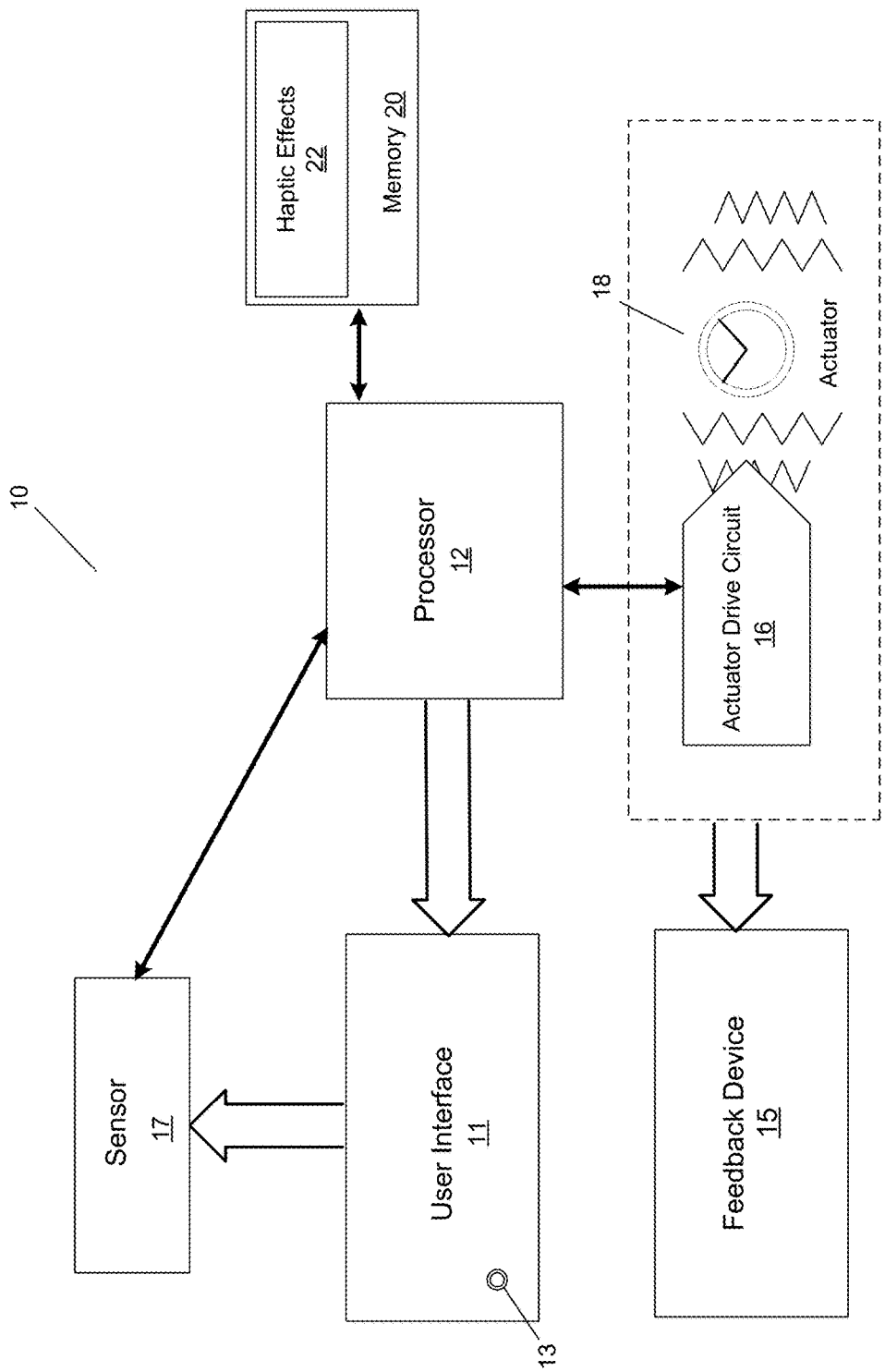
FIG. 1 is a block diagram of a haptically-enabled system in accordance with one embodiment.

FIG. 1 is a block diagram of a haptically-enabled system 10 in accordance with one embodiment. System 10 includes a user interface 11, and may include mechanical keys/buttons 13. System 10 includes a haptic feedback system that generates vibrations on system 10.

The haptic feedback system includes a processor or controller 12. Coupled to processor 12 is a memory 20 and an actuator drive circuit 16, which is coupled to an actuator 18. Actuator 18 can be any type motor, including without limitation an Eccentric Rotating Mass ("ERM"), a Linear Resonant Actuator vibration motor ("LRA"), a piezoelectric motor, or a solenoid actuator. In addition to or in place of actuator 18, system 10 may include other types of haptic output devices (not shown) that may be non-mechanical or non-vibratory devices such as devices that use electrostatic friction ("ESF"), ultrasonic surface friction ("USF"), devices that induce acoustic radiation pressure with an ultrasonic haptic transducer, devices that use a haptic substrate and a flexible or deformable surface or shape changing devices and that may be attached to a user's body, devices that provide projected haptic output such as a puff of air using an air jet, devices that provide electrical muscle stimulation, etc. One or both of actuator drive circuit 16 and actuator 18 can be contained in a feedback device 15 that is wearable, such as a strap, glove, clothing article, or directly attached to a user's skin through an adhesive or mechanical device or non-wearable, such as located in a seat or disposed away from a user's body.

Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic effects are to be played and the order in which the effects are played based on high level parameters. In general, the high level parameters that define a particular haptic effect include magnitude, frequency, and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction.

Processor 12 outputs the control signals to actuator drive circuit 16, which includes electronic components and circuitry used to supply actuator 18 with the required electrical current and voltage (i.e., "motor signals") to cause the desired haptic effects. System 10 may include more than one actuator 18, and each actuator may include a separate drive circuit 16, all coupled to a common processor 12. Memory device 20 can be any type of storage device or computer-readable medium, such as random access memory ("RAM") or read-only memory ("ROM"). Memory 20 stores instructions executed by processor 12. Among the instructions, memory 20 includes a haptic effects module 22 which are instructions that, when executed by processor 12, generate drive signals for actuator 18 that provide haptic effects, as disclosed in more detail below. Memory 20 may also be located internal to processor 12, or any combination of internal and external memory. Actuator 18 can be wireless, containing a wireless receiver to receive haptic playback signals from processor 12.

User interface 11 recognizes user interactions, such as touches with a device or manipulations of virtual objects in a virtual reality application. A "manipulation" of a virtual object can include any perceived contact with a virtual object using "virtual hands" (or other virtual implements) available to and controlled by a user in a virtual world. In other applications, "manipulation" can include control of an element of the application by a user using a user interface. The application would typically provide visual feedback to the user that tracks the user interaction and guides the user with its feedback. Embodiments where user interface 11 recognizes touches may also recognize any of the position, pressure magnitude, and duration of touches on the touch surface. Embodiments where user interface 11 recognizes manipulations of virtual objects in a virtual reality application may recognize the position of hands or fingers or can receive input from a mouse or other input interface for manipulation of virtual objects. The data corresponding to the user interactions can be referred to as manipulation haptic information or data, and is sent to processor 12, or another processor within system 10. Processor 12 interprets the user interactions and in response generates haptic effect signals. User interface 11 may sense touches using any sensing technology, including capacitive sensing, resistive sensing, surface acoustic wave sensing, pressure sensing, optical sensing, etc. User interface 11 may sense multi-touch contacts and may be capable of distinguishing multiple touches and the location of the touches that occur at the same time. User interface 11 may be a touchscreen that generates and displays images for the user to interact with, such as keys, dials, etc., or may be a touchpad with minimal or no images. User interface 11 may sense position of hands and fingers using sensors attached to gloves or using visual sensors that track the position of hands or fingers in space.

System 10 may include a variety of sensors, such as sensor 17, for sensing interactions with the haptically enabled application including, among others: degrees of freedom sensors detecting up to the six degrees of motion including one or more of up/down, back/forward, right/left, roll, pitch, and yaw. Such sensors can include magnetic sensors, electromagnetic field sensors, accelerometers, gyroscopes, and others for detecting positional and angular data. Force sensing resistor ("FSR") sensors and multi-touch pressure sensors can measure the pressure applied under each touch location. Temperature, humidity, and atmospheric pressure sensors can capture environmental conditions. A microphone can capture a user's voice command or environmental audio information. The data corresponding to sensor 17 is sent to processor 12, or another processor within system 10, and processor 12 interprets the sensor data and in response generates haptic effect signals.

One of skill in the art will understand that in some embodiments, system 10 may include any suitable variety of actuators for providing vibrotactile or kinesthetic feedback in addition to the ones specifically mentioned herein. For example, feedback can also include devices that deform or apply pressure to a user's skin.

System 10 may be a handheld device, such a cellular telephone, personal digital assistant ("PDA"), smartphone, computer tablet, gaming console, vehicle based interface, etc. System 10 may be used with a virtual reality rig, including a display device and one or more sensors, such as sensor 17, to track movement of a user's hands. User interface 11 may be a touch sensitive surface, or can be any other type of user interface such as a mouse, touchpad, mini-joystick, scroll wheel, trackball, game pads or game controllers, gloves with integrated or mounted sensors, motion tracking cameras, etc. In embodiments with more than one actuator, each actuator may have different haptic expression, producing a different range of haptic effects. For example, each rotational actuator may have a different rotational capability in order to create a wide range of haptic effects on the device, for example each actuator can be controlled individually; also some rotational actuators have their axis of rotation at an angle to the axis of rotation of other rotational actuators. Likewise, in embodiments with multiple actuators with other capabilities, each actuator can be controlled individually to exhibit a wide range of haptic effects on the device.

In addition to providing user interfacing haptic effects, system 10 may provide statically generated haptic effects for playback in system 10 along with, for example, a video or audio file.

One example of a system, such as system 10, includes a single or multi-actuator wearable strap, such as feedback device 15, worn on the wrist of a user as the user is interacting with a virtual world. In this case, the haptic effects on the wrist can be non-collocated with the perceived virtual contact of the virtual hand in the virtual world. As a user interacts with the environment and contacts virtual objects, the wrist based wearable strap gives a haptic cue (feedback) for the virtual contact. The haptic cue can be a short vibration or a short transient soft deformation effect using actuators or other haptic playback devices. Other embodiments may provide haptic feedback through non-wearable devices, such as haptic playback devices in a seat or haptic playback devices disposed away from the user's skin. The haptic cue may not be an exact representation of the contact. The haptic cue may not be collocated with the interaction nor rendering realistic interaction forces to the user as the user manipulates or contacts an object, but because the user is visually and aurally immersed in the environment, haptic cues can provide a useful haptic feedback even if they are merely indicative of the user's interaction with the virtual world.

Figure 2:
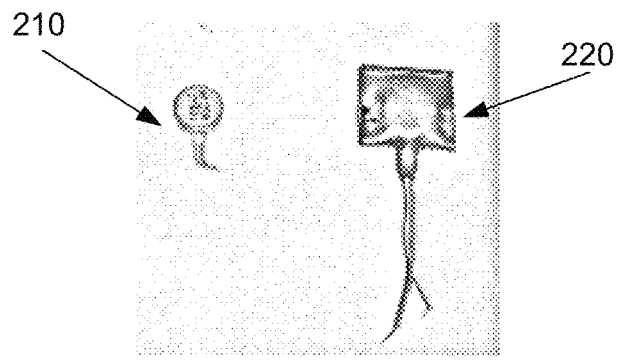
FIG. 2 shows an example ERM type actuator configured to be worn in accordance with some embodiments.

FIG. 2 shows an example ERM type actuator 210 configured to be worn in accordance with some embodiments. Actuator 210 can be encased in rubber or other sheathing material 220 so that the sheathed actuator can rest against the user's skin. The system can work with a single actuator, however multiple actuators can provide more realism by using the sensor information about hand position and triggering the actuator on the same plane as the virtual collision.

For example, if the front of the hand collides with an object, an actuator on the front of the wrist can provide a haptic effect.

Figure 3:
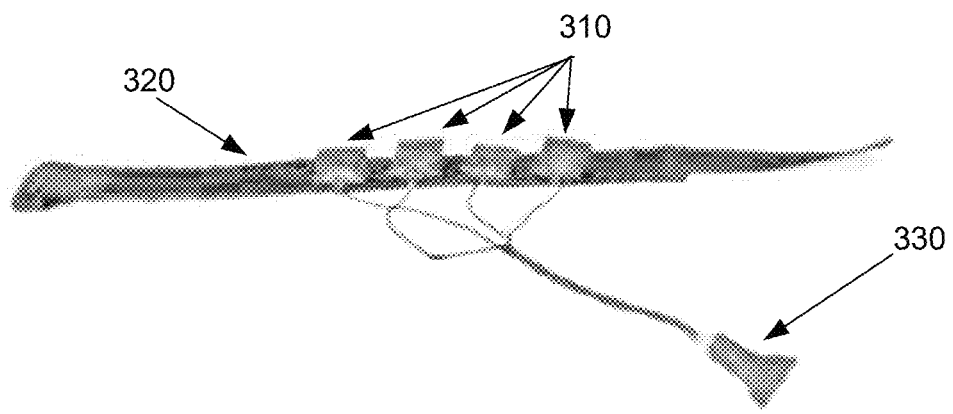
FIG. 3 shows an example actuator array using multiple ERM type actuators in a strap configuration in accordance with some embodiments.

FIG. 3 shows an example actuator array using multiple ERM type actuators in a strap wearable configuration, such as feedback device 15, in accordance with some embodiments. One or multiple actuators 310 can be incorporated into a strap 320 that can be wrapped around a user's wrist to provide one actuator on the top and bottom of the wrist and one actuator on each side of the wrist. Wrist strap 320 can connect to a microcontroller, such as processor 12, via a connector 330 or wireless interface (not shown). The actuators can be attached to the strap and positioned around the wrist about every ninety degrees. The actuators can be attached to the strap by Velcro or a similar type of temporary fastener so that they can be moved to accommodate different sized wrists. The actuators can activate according to the interaction with the virtual world and virtual objects within the world.

In some embodiments, actuators can be attached to body parts, such as a user's wrist (as in the example above), hands, arms, ankles, legs, and head. The actuators can be controlled using standard methods to control haptic devices. For example, an application running on a host device can call a haptic effect to be played according to the function of the application. In a gaming application, a haptic effect may be called when the user's hand contacts an object in the game. A microcontroller, such as processor 12, on a wearable strap, such as feedback device 15, can receive the haptic command, process it, and write the required motor voltage to the actuator that is meant to play the haptic effect. The actuator control can include advanced control algorithms, such as the use of ERM overdriving or braking to create unique and more varying haptic effects. When a haptic actuator is in close contact with the skin, such as through a rubber sheath, short pulse distinctive haptic cues through overdriving and braking can be used to simulate a press feeling even though the actuator is primarily a vibratory actuator.

The system can also be used to add haptics to a system that lacks any haptics or can be used to supplement a system with haptics. For example, a user can interact with a touch surface and receive touch feedback haptic cues through an actuator or actuator strap assembly located on the user's wrist, such as feedback device 15. Such haptic cues can be more beneficial than not having any haptics or can be used to enhance or alter the haptic experience with a touch surface.

Some examples of immersive displays include the "Oculus Rift" by Oculus VR, Inc. and the "Head Mounted Display" or "Wearable HDTV" by Sony Electronics Inc. and the "Project Morpheus" head mounted display, by Sony Computer Entertainment Inc. Haptics adds additional realistic elements to interactions using immersive displays. Even though in some embodiments system 10 only provides haptic cues, as with many haptic feedback systems, users can quickly adapt to devices with haptic feedback. Even in systems where the haptic feedback device is not collocated, users can adapt to the non-collocated feedback effectively.

Users can interact with an application using multiple input methods by user interface 11. For example, a user can interact with more traditional computer human interface means, such as keyboards, mice, trackpads, and the like, as well as newer interfaces such as visual touch interfaces. In addition some interfaces that can be used include gaming controllers, such as the "Razer Hydra" motion sensing controller by Razer Inc., with sensors to detect up to the six degrees of movement above. In some embodiments, interfaces include non-touch motion tracking interfaces that use camera technology or infra-red sensors to track objects and motion. In some embodiments, interfaces include wearable gloves with integrated or mounted sensors that can detect motion and position of hands, such as "CyberTouch" gloves by CyberGlove Systems LLC.

Figure 4:
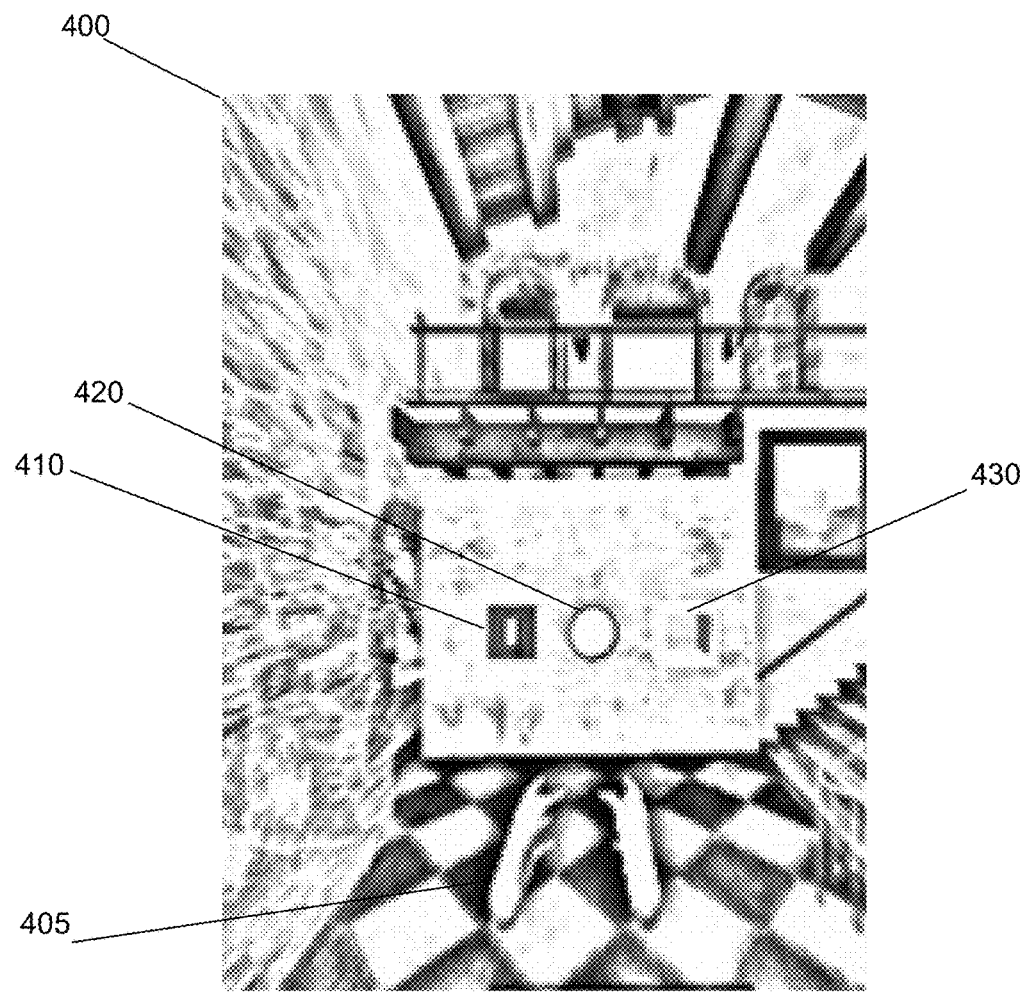
FIG. 4 shows a screenshot of an example interaction that can take place using non-collocated actuators in accordance with some embodiments.

FIG. 4 shows a screenshot 400 of an example interaction that can take place using non-collocated actuators in accordance with some embodiments. In this example, a user is wearing a virtual reality headset to create the visual environment. The user can control the virtual hands 405 using a gaming peripheral such as the Razer Hydra or "Kinect" controller from Microsoft Corp. The user can interact with three virtual objects: a light switch 410, a rotary dial 420, and a wooden box 430.

For the light switch 410, the user can interact by moving the virtual hand up and down to turn the light switch on or off. Haptic effects can be felt on the wrist when the light switch is positioned in the up or down position using wrist strap 320 of FIG. 3 or some other haptic playback device. In a haptic playback system or device arranged with multiple haptic playback devices the haptics can be given spatial meaning. For example, with the wrist strap 320 of FIG. 3, when moving from down to up the user can feel the haptic effect on the top of the wrist. In addition to this haptic indication of the virtual physical interaction, a second haptic effect can be triggered that relates to the state of the light switch. For example, a haptic effect that is proportional to the overall light intensity can be produced where the brighter the light, the stronger the haptic effect (i.e., greater magnitude). Haptic effects that incorporate flow aspects can also be rendered. For example, a top actuator can be activated followed sequentially by a bottom actuator creating a haptic effect that flows from the top to the bottom.

For the rotary dial 420, the user can interact by pressing a button on the peripheral device or in the virtual world to engage the virtual dial 420. The user then can rotate virtual dial 420 by turning the wrist in a clockwise or counterclockwise direction. Haptic effects can be played on the user's wrist according to the programmed detent spacing on the virtual dial. For example, detents can be represented at a ten degree spacing so that a haptic effect occurs every ten degrees of turning of the virtual dial. If multiple actuators are available spatial flow type haptic effects can be displayed. For example, as the user turns the device clockwise the actuators in a strap around the user's wrist can sequence in a clockwise manner.

The example with rotary dial 420 also shows that system 10 can provide a symbolic haptic representation of an interaction. For example, the physical properties of a virtual dial may be to have detent positions around the dial. In the real world, the dial may click as it is turned. In the virtual world, these can be symbolically represented using haptics by activating one or more actuators to provide physical attribute information via the haptics device. For example, in one interaction where the user is turning a virtual dial, the detents can be symbolically represented by activating actuators in a clockwise sequence around the user's wrist. In another example, the detents can be symbolically represented by always activating the actuator nearest the 12 o'clock position (regardless of how the wrist is positioned) or always activating the actuator in a particular position on the wrist, such as the actuator closest to the top of the hand. Therefore, the haptic effect can also portray physical property information of the rotary dial in the virtual world.

Symbolic haptic representation can also include symbolic state information about a virtual object. For example, the state information of a virtual dial may include a rotational limit, such as for a volume dial turned to a maximum setting. When the state of the virtual dial has reached the rotational limit, feedback can be provided to indicate symbolically that the limit has been reached, such as a feeling of a press or a rapid on/off repeated feedback. Thus, using non-collocated haptics can also provide symbolic representation of a real-world counterpart to a virtual object by combining the physical properties of an object with the state of the object—in the example of dial 420, the rotational position of the dial relative to the next detent position or relative to a rotation limit. In the example of switch 410, the position of the switch can be the state and the smoothness of the operation of the switch can be a physical property of the switch.

Figure 5:
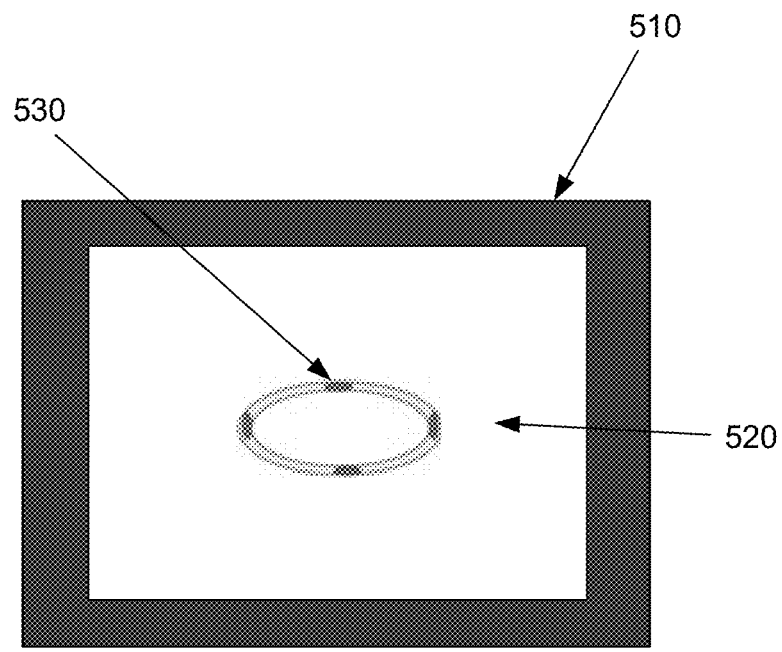
FIG. 5 illustrates a virtual box with a multi actuator wearable wrist strap in accordance with some embodiments.

For virtual wooden box 430, the user can interact by inserting the virtual hand in the box and moving to contact one of the four surfaces of the box: the top, bottom, left, or right sides. FIG. 5 illustrates a virtual box 510 with a multi actuator wearable wrist strap 520 in accordance with some embodiments. With a wearable strap having multiple haptic playback devices, such as feedback device 15, as with wrist strap 520, actuators can be positioned on the top, bottom, right, and left side of the wrist. The actuator located on the correct side of the virtual contact can be activated. For example, if the top of the hand hits the top of the box, the top actuator 530 can be activated. If the top of the user's hand hits the left side of the box the top actuator can still be activated because the system can compensate for the rotation of the user's wrist. In this example, the haptic effect is still non-collocated because the sensations are felt on the user's wrist even though the user's virtual hand is making contact. In some embodiments, the haptic effect can be collocated by positioning the actuators on the hand.

In some embodiments the multiple haptic playback devices can all be placed to provide feedback on one position on the user's wrist. For example, all of the actuators in wearable wrist strap 520 can be positioned on the bottom of the wrist. In this embodiment actuator scheduling can be used in order to increase the provided range of haptic effects. For a light effect only one actuator can be used. For a medium effect two or three actuators can be used and for a strong effect all four actuators can be used simultaneously. Similarly, multiple actuators can be used at each position to combine actuator scheduling at each position, with location specific effects.

Figure 6:
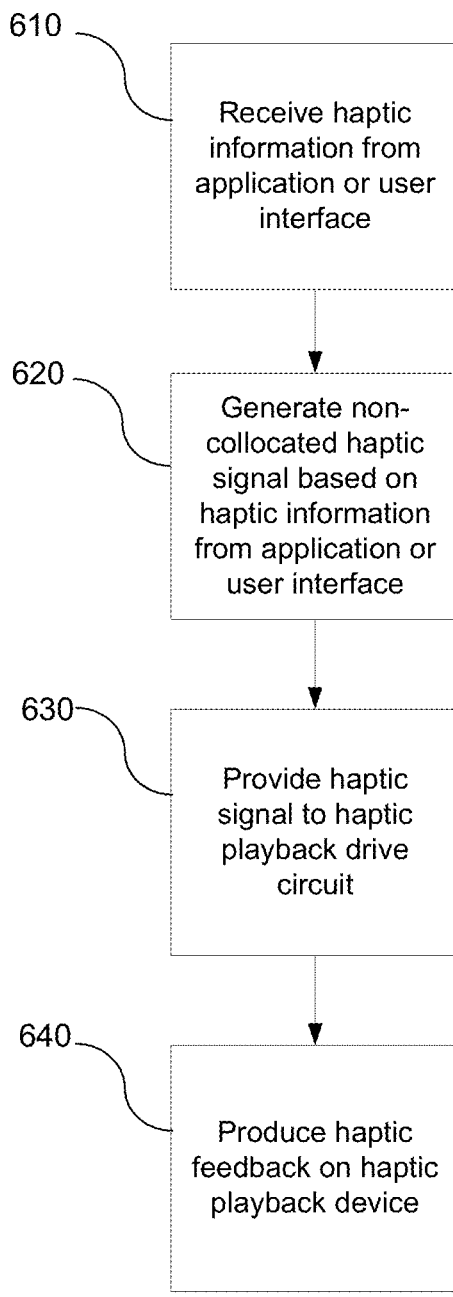
FIG. 6 is a flow diagram illustrating the functionality of a haptic playback device in accordance with some embodiments.

FIG. 6 is a flow diagram illustrating the functionality of a haptic playback device in accordance with some embodiments. In one embodiment, the functionality of the flow diagram of FIG. 6 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 610, haptic information is received from an application or user interface, such as user interface 11. In the case where haptic information is received from an application, the application can generate the haptic information based on a user's interaction with the system. For example, a user can interact with an application via user interface 11. The application can interpret the user's interactions by user interface 11 and provide a corresponding reaction on a display. In addition, the application can provide haptic information based on the user's interactions and application reaction. In the case where haptic information is received from a user interface, such as user interface 11, haptic information can be received directly from the user interface. Such information may include information on the orientation of a user's hands and perceived actions taken by the user. In some embodiments, the haptic information can be received wirelessly. In embodiments where the haptic information is received wirelessly, such wireless technologies used for wireless reception can include any known types of wireless technology including those based on radio frequencies, magnetic fields, and visible and invisible electromagnetic frequencies.

At 620, the haptic information can be processed to generate a non-collocated haptic signal. For example, if the haptic information from an application informs that a virtual hand contacted a virtual object on the top of the hand, the haptic information can be processed to generate a haptic signal based on that information. In some embodiments, where the actuators are located on a wrist strap, such as 320 of FIG. 3, and non-collocated from the perceived contact, the haptic signal can include information to activate a haptic playback device, such as actuator 18, located on the wrist in the same orientation as the virtual contact. For example, if the wrist is orientated so that the user's thumb is up, and the thumb contacts the top of a wooden box, as discussed above with respect to FIG. 4, then the haptic playback device on the up part of the wrist can be activated. The activation information can be contained in the produced haptic signal.

At 630, the haptic signal can be provided to the haptic playback drive circuit, such as actuator drive circuit 16. The drive circuit can contain a power source for operating the haptic playback device, such as actuator 18. The drive circuit can also translate the haptic signal into low-level motor commands or other appropriate low-level commands according to the technology of the haptic playback device. In some embodiments, the drive circuit can provide overdrive and braking commands to the haptic playback device to achieve a wider range of haptic playback capabilities than the haptic playback device is originally designed to incorporate. Such methods can be used to produce short pulse haptic cues to simulate a press haptic effect. The haptic signal can be provided by wire or wirelessly to the haptic playback drive circuit. In embodiments where the haptic signal is provided wirelessly, such wireless technologies used for wireless transmission can include any known types of wireless technology including those based on radio frequencies, magnetic fields, and visible and invisible electromagnetic frequencies.

At 640, the haptic feedback is produced on the haptic playback device, such as actuator 18 based on the haptic signal. One will understand that the haptic signal here can include low-level commands or playback device specific commands based on the haptic signal produced in 620. In some embodiments, the haptic playback device can receive the haptic signal (or low-level commands) wirelessly, using any known wireless technology such as those previously discussed. In some embodiments, haptic feedback can be produced on some haptic playback devices available, but not others. For example, the haptic playback device chosen for activation can be based on information in the haptic playback signal (or low-level commands) and can be chosen based on the playback device's location or based on a desired intensity or magnitude of the haptic effect.

Some embodiments include a user wearing augmented reality glasses. A user can gesture to control a property of the augmented reality. For example a user can gesture to control the light intensity in a house by turning the user's hand. Feedback device 15 can communicate haptic effects such as spaced detents or effects that change with an intensity proportional to the change in light intensity. One of skill in the art will understand that other gestures could be used to control other aspects of an augmented reality, each providing haptic effects appropriate for the gesture and controlled aspect of the augmented reality.

As disclosed, embodiments implement a haptic feedback system using wearable haptic playback devices to provide haptic cues based on interactions with a user interface. The haptic playback devices can be non-collocated to the subject of the interaction so that a haptic effect is perceived to coincide with the subject of the interaction but occurs at a different physical location than the subject of the interaction. Multiple playback devices can be used to provide a symbolic representation of physical attributes of objects being manipulated through interaction with the user interface. Multiple playback devices can be used to provide different levels of intensity of haptic effects through actuator scheduling.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A device for delivering haptic feedback comprising:
a wearable device configured to surround a part of a human body that is non-collocated with an interacting member;
a plurality of haptic playback devices contained within the wearable device and positioned at a plurality of locations configured to surround the part of the human body when the wearable device is worn;
a drive circuit for controlling the plurality of haptic playback devices; and
a processor, electronically coupled to the drive circuit, configured for:
receiving manipulation haptic information based on data from a user interface indicative of a virtual contact of the interacting member,
generating a haptic signal based on the manipulation haptic information and an orientation of the wearable device, wherein the haptic signal is configured to produce haptic feedback in at least one of the plurality of haptic playback devices chosen to provide the haptic feedback to the part of the human body at an output location of the plurality of locations, wherein the output location of the haptic feedback to the part of the human body is adjusted based on the orientation of the wearable device such that the output location at the part of the human body corresponds to a direction of the virtual contact of the interacting member, and
providing the haptic signal to the drive circuit to produce the haptic feedback in the at least one of the plurality of haptic playback devices.

2. The device of claim 1, wherein the plurality of haptic playback devices includes at least two haptic playback devices configured to produce the haptic feedback.

3. The device of claim 2, wherein the at least two haptic playback devices are located in a same proximity, and wherein the haptic feedback is produced in one or both of the at least two haptic playback devices based on a targeted intensity of the haptic feedback.

4. The device of claim 1, wherein the plurality of haptic playback devices includes at least four haptic playback devices positioned at top, bottom, right and left sides of the wearable device.

5. The device of claim 4, wherein the haptic feedback is symbolic of the manipulation haptic information.

6. The device of claim 1, wherein the plurality of haptic playback devices includes at least four haptic playback devices positioned at the plurality of locations, wherein the manipulation haptic information corresponds to manipulation of a virtual object in a virtual reality interface with the interacting member.

7. The device of claim 6, wherein the haptic feedback is symbolic of the manipulation of the virtual object.

8. The device of claim 1, wherein the at least one of the plurality of haptic playback devices is an actuator, and actuator overdriving and braking is used to produce short pulse haptic cues to simulate a press haptic effect.

9. A method for delivering haptic feedback comprising:
receiving manipulation haptic information based on data from a user interface indicative of a virtual contact of an interacting member;
generating a haptic signal based on the manipulation haptic information and an orientation of a wearable device, wherein the haptic signal is configured to produce haptic feedback in at least one of a plurality of haptic playback devices, the plurality of haptic playback devices being non-collocated with the interacting member and positioned within the wearable device at a plurality of locations configured to surround a part of the human body when the wearable device is worn; and
providing the haptic signal to a drive circuit for controlling the at least one of the plurality of haptic playback devices to produce the haptic feedback,
wherein the at least one of the plurality of haptic playback devices is chosen to provide the haptic feedback to the part of the human body at an output location of the plurality of locations, wherein the output location of the haptic feedback to the part of the human body is adjusted based on the orientation of the wearable device such that the output location at the part of the human body corresponds to a direction of the virtual contact of the interacting member.

10. The method of claim 9, wherein the plurality of haptic playback devices includes at least two haptic playback devices configured to produce the haptic feedback.

11. The method of claim 10, wherein the at least two haptic playback devices are located in a same proximity, and wherein the haptic feedback is produced in one or both of the at least two haptic playback devices based on a targeted intensity of the haptic feedback.

12. The method of claim 9, wherein the plurality of haptic playback devices includes at least four haptic playback devices positioned at a top, bottom, right and left sides of the wearable device.

13. The method of claim 12, wherein the haptic feedback is symbolic of the manipulation haptic information.

14. The method of claim 9, wherein the plurality of haptic playback devices includes at least four haptic playback devices positioned at the plurality of locations, wherein the manipulation haptic information corresponds to a manipulation of a virtual object in a virtual reality interface with the interacting member.

15. The method of claim 14, wherein the haptic feedback is symbolic of the manipulation of the virtual object.

16. The method of claim 9, wherein the at least one of the plurality of haptic playback devices includes an actuator, the method further comprising:

overdriving and braking the actuator to produce short pulse haptic cues to simulate a press haptic effect.

17. A non-transitory computer readable medium with instructions stored thereon that, when executed by a processor, cause the processor to:

receive manipulation haptic information based on data from a user interface indicative of a virtual contact with an interacting member;

generate a haptic signal based on the manipulation haptic information and an orientation of a wearable device, wherein the haptic signal is configured to produce haptic feedback in at least one of a plurality of haptic playback devices, the plurality of haptic playback devices being non-collocated with the interacting member and positioned within the wearable device at a plurality of locations configured to surround a part of the human body when the wearable device is worn; and provide the haptic signal to a drive circuit for controlling the at least one of the plurality of haptic playback devices to produce the haptic feedback, wherein the at least one of the plurality of haptic playback devices is chosen to provide the haptic feedback to the part of the human body at an output location of the plurality of locations, wherein the output location of the haptic feedback to the part of the human body is adjusted based on the orientation of the wearable device such that the output location at the part of the human body corresponds to a direction of the virtual contact of the interacting member.

18. The non-transitory computer readable medium of claim 17, wherein the plurality of haptic playback devices includes at least two haptic playback devices configured to provide the haptic feedback.

19. The non-transitory computer readable medium of claim 18, wherein the at least two haptic playback devices are located in a same proximity, and wherein the haptic feedback is produced in one or both of the at least two haptic playback devices based on a targeted intensity of the haptic feedback.

20. The non-transitory computer readable medium of claim 17, wherein the plurality of haptic playback devices includes at least four haptic playback devices positioned at top, bottom, right and left sides of the wearable device.

21. The non-transitory computer readable medium of claim 20, wherein the haptic feedback is symbolic of the manipulation haptic information.

22. The non-transitory computer readable medium of claim 17, wherein the plurality of haptic playback devices includes at least four haptic playback devices attached to the wearable device, wherein the manipulation haptic information corresponds to manipulation of a virtual object in a virtual reality interface with the interacting member.

23. The non-transitory computer readable medium of claim 22, wherein the haptic feedback is symbolic of the manipulation of the virtual object.

24. The non-transitory computer readable medium of claim 17, wherein the at least one of the plurality of haptic playback devices include an actuator, and the instructions are further configured to cause the processor to:

overdrive and brake the actuator to produce short pulse haptic cues to simulate a press haptic effect.

* * * * *